United States Patent [19]

Miller

[11] 4,352,201
[45] Sep. 28, 1982

[54] DATA TRANSMISSION SYSTEM

[75] Inventor: Geoffrey D. Miller, Plymstock, England

[73] Assignee: M.L. Engineering (Plymouth) Limited, England

[21] Appl. No.: 34,510

[22] Filed: Apr. 30, 1979

[51] Int. Cl.$^3$ .............................................. H04B 3/50
[52] U.S. Cl. ....................................... 455/58; 455/56; 179/19
[58] Field of Search ................. 325/5, 32, 57; 455/15, 455/16, 17, 18, 31, 32, 51, 53, 56, 58; 375/2; 179/19, 30, 38

[56] References Cited

U.S. PATENT DOCUMENTS 4,145,657 3/1979 Hanni ..................................... 455/58
4,156,112 5/1979 Moreland ....................... 179/15 AL Primary Examiner—Tommy P. Chin
Attorney, Agent, or Firm—Thomas J. Greer, Jr.

[57] ABSTRACT

A system for the transmission of data from a number of out-station transmitters to a central receiver over a communication line or channel in which each out-station transmitter has an associated timer and a detector which "listens" to the line or channel and enables the transmitter only in the absence of detected signals from the other transmitters on the line or channel. When enabled each transmitter transmits data over the line or channel under control of its associated timer for a time interval during which the other transmitters are inhibited. The time intervals commence from the start times which differ from each other by different random delays which are short compared with the timed intervals, so that upon initial switching on of the system one of the transmitters will always commence transmission, followed by all the other transmitters in sequence.

5 Claims, 4 Drawing Figures

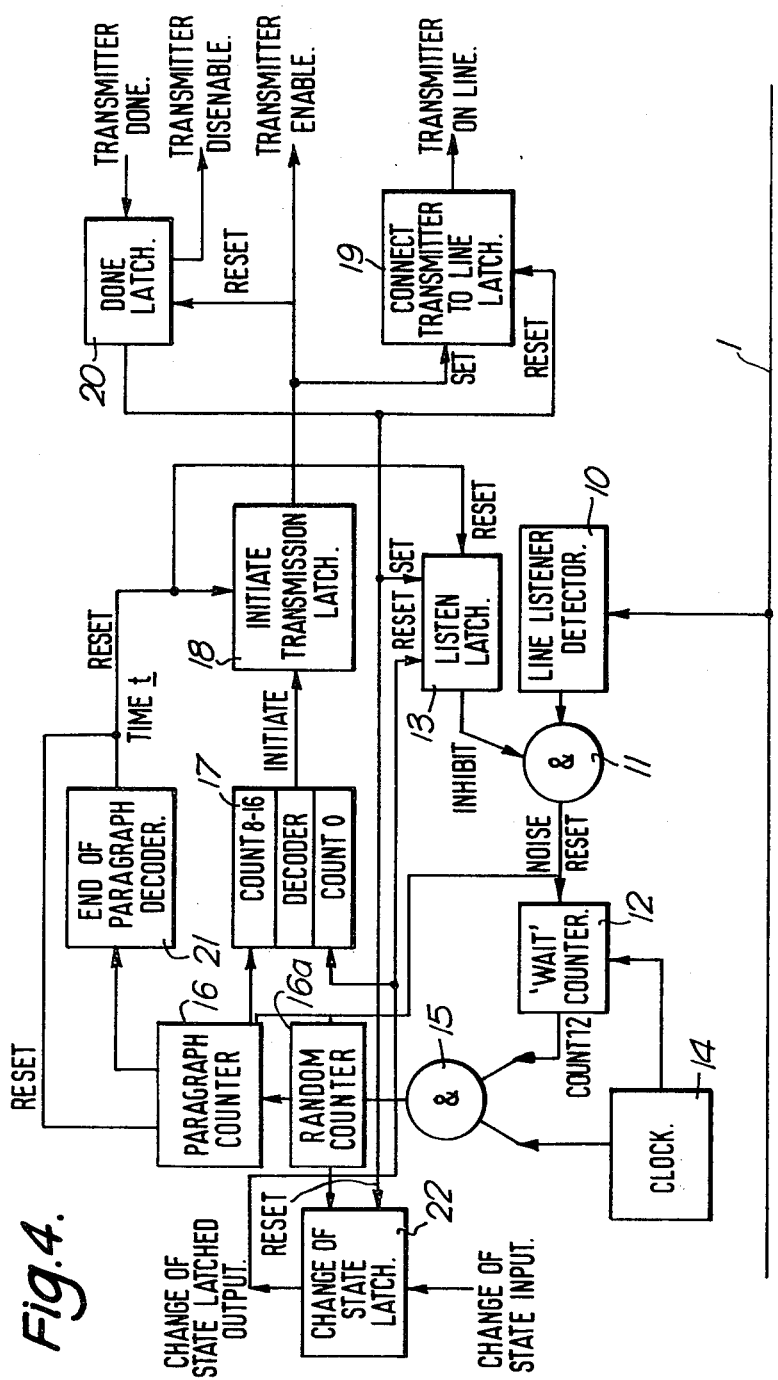

DATA TRANSMISSION SYSTEM

This invention relates to data transmission systems. More particularly, the invention concerns systems for the transmission of data, in digital form, from a member of different stations over a single line or channel.

Various electronic multiplexing techniques are known for enabling a single transmission from a number of different remote stations. In the technique known as Time Division Multiplexing (TDM) a number of different data transmitters are connected to a common data transmission channel for transmitting data to a data receiver. The transmitters are connected to the channel in sequence under control of a master transmitter which sends coded signals along the line to activate each data transmitter in turn so that at any given time only one transmitter is sending information along the line.

In such a system a receiver must be associated with each data transmitter for receiving the control signals from the master transmitter and decoding these signals to activate the associated transmitter in the correct sequence. The sequential transmission of data from the different transmitter stations along the channel is controlled centrally by the master control transmitter, usually located at a central control station with the data receiver. The provision of a receiver at each data transmission station for receiving the control signals from the master transmitter is a disadvantage of such known TDM systems.

An object of the present invention is to provide an improved data transmission system which can lead to a considerable simplification in the equipment required, particularly at the remote transmitter stations.

According to the present invention there is provided a data transmission system in which a receiver is arranged to receive data transmitted from a number of different transmitters sequentially over a communication line or channel, each transmitter having an associated timer unit and detector which enables the transmitter only in the absence of detected signals or noise from the other transmitters on the line or channel, the transmitters when enabled transmitting data over the line or channel, under control of the associated timer units for time intervals commencing from respective start times which, relative to the commencement of the absence of detected signals or noise on the line or channel, differ for each transmitter by random delays.

The present invention enables a number of data transmitters at different stations to transmit data at different times over the communication line or channel by controlling the individual transmitters by the respective timer units located at each transmitter station, thereby avoiding the need for separate receivers at each transmitter station for the reception of transmitter control signals.

The system of the present invention ensures that initially one of the transmitters, associated with the timer unit having the earliest start time, will always commence operation, and that the other transmitters will follow sequentially under control of their respective timer units.

In a preferred embodiment of the invention the detector associated with each transmitter is responsive to a predetermined noise level or to a signal from any of the other transmitters on the line or channel to reset of a "wait" interval timer which determines the respective start time of the transmitter. Each "wait" interval timer is preferably arranged to inititate operation of the timer unit associated with the transmitter after a predetermined "wait" interval only if the "wait" interval timer is not itself reset during the "wait" interval, the said timer unit initiating operation of the associated transmitter and timing an interval which terminates after the transmission of all the other transmitters in the system, during which interval the "wait" interval timer and/or the associated detector is inhibited from further operation.

It is preferably arranged that the "wait" intervals timed by the wait interval timers differ for all the transmitters, the intervals timed by the respective main interval timer units being substantially the same in all the transmitters.

Each of the aforesaid "wait" intervals may be made up of a fixed wait period to which is added a random delay, so that the "wait" intervals for all the transmitters differ from each other. In this embodiment of the invention the various transmitters do not have a predetermined sequence of operation. When the system is first switched on the "wait" interval timers at all the transmitters will all commence timing the "wait" interval, but these intervals will differ because of the different random delays included therein. This will result in one of the "wait" interval timers completing the timing of its "wait" interval first, to initiate operation of its associated transmitter and to provide a pulse for inhibiting all the other transmitters. This pulse causes the "wait" interval timers to be reset by their associated detectors until the first transmission is complete, when a period of comparative line or channel silence will ensue. During this period the first transmitter will be effectively silenced by the inhibition of its associated "wait" interval timer and/or detector, so that the next timer unit to complete the timing of its "wait" interval as determined by its random delay will switch on its associated transmitter and cause the second transmission of the sequence. These operations continue until all the transmitters of the system have transmitted over the line or channel.

It will be seen that with this embodiment of the invention the transmitters, through their associated timer units and random interval timers, rapidly establish, by virtue of the built-in random intervals, a sequence of operation.

The monitoring of the line or channel immediately preceding each predetermined transmission interval also affords a facility for the interruption of the transmitter scanning sequence to transmit data from any one of the transmitters out of sequence in the event of an alarm or other special condition occurring at that transmitter. Thus in a preferred embodiment of the invention a change of state detector is associated with each transmitter and is effective in response to the existence of an alarm or other change of state condition at the transmitter to energise the transmitter in response to the detection of an absence of signals on the line or channel, or in response to the detection of signals or noise of amplitude lower than a threshold level, during a "listening" interval which is less than the "wait" intervals of any of the transmitters. If an alarm or other change of state condition occurs at any one transmitter the change of state detector energises the transmitter after a period of relative line or channel silence which is shorter than the period required for the regular switching on of any of the other transmitters, thereby ensuring that the transmitter with the special condition "jumps in" ahead of the other transmitters. Thus an alarm or emergency condition can be signalled from any one transmitter to the receiver without the delay which would otherwise be incurred if the transmitter in question had to wait until its correct turn in the sequence of transmissions.

The data transmitted over the system according to the invention would in practice be digital data, either fed direct to the transmitters at the respective stations or obtained by analogue-to-digital conversion of readings at the transmitter stations. The package of data transmitted from each transmitter will in practice consist of a "sentence" made up of a number of digital "words" a word being defined as a predetermined number of bits.

In a time division multiplex system of the kind to which the present invention relates, it is essential that the data transmitted by the individual transmitters should be clearly identified with these transmitters, so that if the transmitted sentences are interrupted, for example as a result of an interruption of the data transmission cycle by interference on the line or channel, the transmitted data can be readily identified with its transmitter. For this purpose the present invention also provides a convenient method of identifying each package or sentence of transmitted data by an "address word" which has a different length from all the other words in the sentence.

The address word is identifiable by virtue of its length regardless of its position in the sentence or package of words transmitted by a given transmitter. Preferably each transmitter transmits a sentence consisting of a given predetermined number of words with the address word comprising the first word of the sentence. The address word would preferably be longer than the other words transmitted by the transmitter, and for certain applications part of the address word may be taken up by data from the transmitter.

The invention will be further described, by way of example, with reference to the accompanying drawings, in which:

FIG. 4 is a block schematic diagram of a timer unit associated with a transmitter in the embodiment of FIG. 3.

Figure 1:
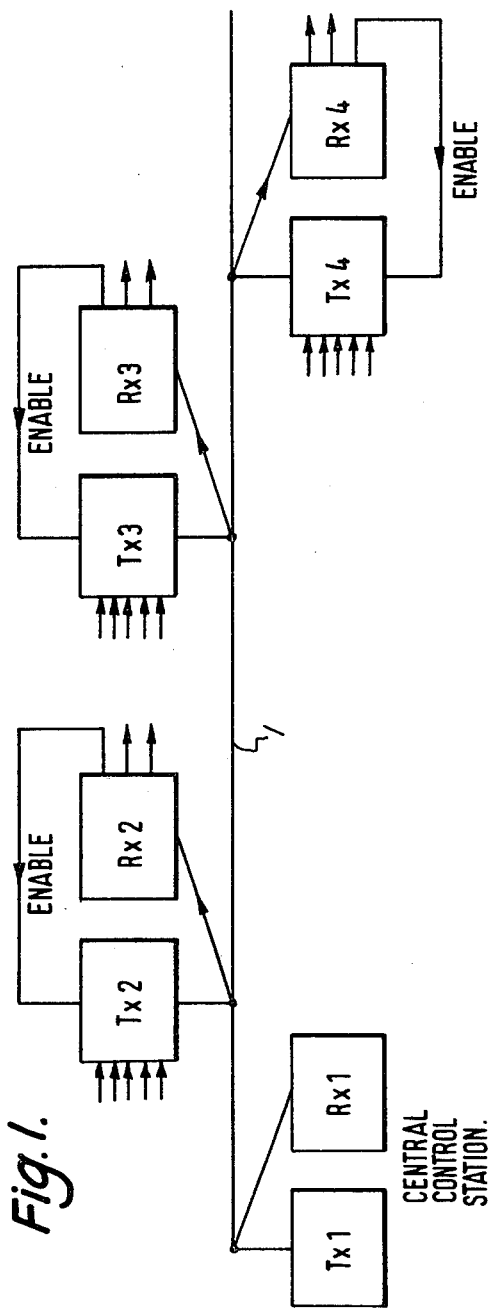
FIG. 1 is a schematic diagram of a typical Time-Division Multiplex data transmission system of a known type.

Referring first to FIG. 1, a typical prior art Time-Division Multiplex data transmission system is illustrated in which a number of transmitters Tx1, Tx2, Tx3, Tx4 are connected to a common communication line or channel 1, for example a line pair telephone link. The transmitter Tx1 is located at a central control station and acts as a master controller, while the transmitters Tx2, Tx3 and Tx4 are located at different remote stations from which data is to be transmitted, over the common line or channel 1, to the central station. Each transmitter Tx2, Tx3, Tx4 receives and stores in digital form data relating to the respective station.

The transmitters Tx2, Tx3 and Tx4 are controlled from the central station so that they transmit their data in a predetermined sequence, thereby avoiding the occurrence of more than one data signal on the line 1 at any one time. The data transmitted by the individual out-station transmitters Tx2, Tx3 and Tx4 are received at a central receiver Rx1 at the central control station. The essential feature of this known type of Time-Division Multiplex system is that the sequence of data transmission from the remote transmitters Tx2, Tx3 and Tx4 is controlled at the central station by control signals transmitted by the transmitter Tx1 along the line or channel 1. These control signals are received by respective receivers Rx2, Rx3, and Rx4 associated with the respective out-stations. Each of these receivers Rx2, Rx3 and Rx4 includes means to decode the control signals transmitted by the master transmitter Tx1 such that the transmitters Tx2, Tx3 and Tx4 are activated in a predetermined sequence by "enable" signals provided by the associated receivers Rx2, Rx3 and Rx4 in response to the control signals transmitted by the master transmitter Tx1.

Figure 2:
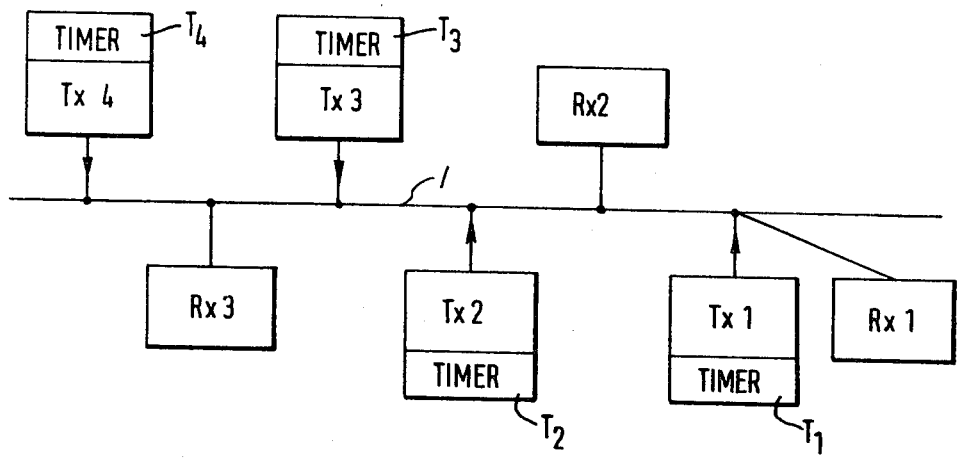
FIG. 2 is a schematic diagram of a data transmission system according to the present invention.

The system of the present invention, illustrated schematically in FIG. 2, avoids the need for separate receivers Rx2, Rx3, and Rx4 at each of the remote out-stations. In the example illustrated four remote out-station transmitters Tx1–Tx4 are connected to the line or channel 1. The transmitter Tx1 in this case is not a master control transmitter as in the prior art system illustrated in FIG. 1, but can in fact be one of the out-station data transmitters. Associated with each of the transmitters Tx1–Tx4 is a respective timer unit $T_1$–$T_4$ which acts as a local controller for the operation of its associated transmitter.

The timer units $T_1$–$T_4$ associated with the transmitters Tx1–Tx4 are arranged to time nominally the same time interval t, which in this case is the time taken for one complete sequence of transmissions, or one "paragraph". Thus the timer units $T_1$–$T_4$ in the illustrated example are identical.

A random sequence of operation of the transmitters Tx1–Tx4 is established by incorporating in the timer units $T_1$–$T_4$ random interval timers which count random or semi-random numbers of clock pulses before connecting the associated transmitter Tx1–Tx4 to the line or channel 1, so that different intervals precede the connection of each transmitter to the line or channel. In consequence one of the transmitters, that is, the one associated with the timer unit having the smallest random clock pulse count, will always be connected to the line or channel 1 before the others. It is arranged, as later described, that once this transmitter is "on line" the presence of its signals on the line or channel 1 inhibits all the other transmitters.

Figure 3:
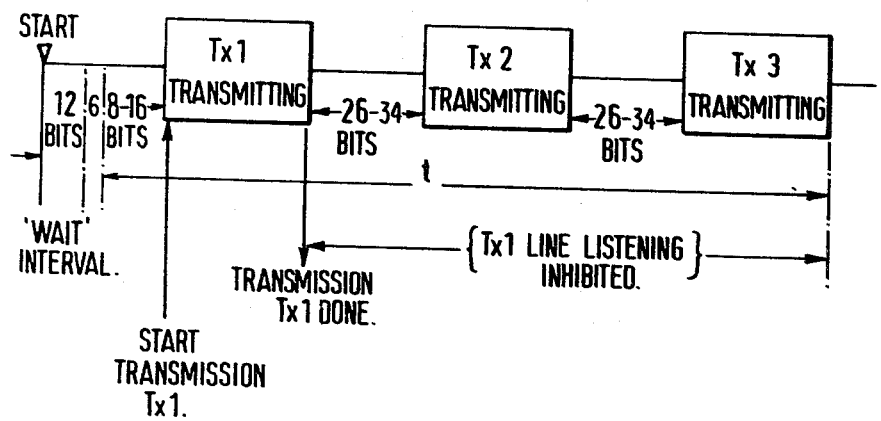
FIG. 3 is a time sequence diagram illustrating the sequence of data transmission from three different transmitters arranged to operate in a random sequence employing a system according to one embodiment of the invention.

FIG. 4 shows diagrammatically one of the transmitter timer units, it being understood that all the transmitters have identical timer units. A line listening detector 10 is connected to the communication line or channel 1 and is connected through an AND gate 11 to a "wait" counter 12 arranged to time a fixed "wait" period part of random length "wait" interval. A listen latch 13 provides another input to the AND gate 11. When the latch 13 is set as later described the gate 11 is enabled such that the output from the line listening detector 10 is effective to "reset" or "enable" the "wait" counter 12 in dependence on the presence or absence of a signal on the line 1. The counter 12 is arranged when so enabled to count a predetermined number (twelve in this example, as shown in FIG. 3) of clock pulses from a clock pulse generator 14. At the end of this "wait" interval the counter 12 opens a gate 15 which enables a random counter 16a arranged to time random delay part counter 16. The random counter 16a times a random delay immediately following the "wait interval." The random of the wait interval 16a counts pulses generated by a "fast clock" (not shown) which provides pulses at, for example, 1000 times the frequency of the pulses provided by the clock pulse generator 14. Conveniently, the fast clock is made from components with wide tolerances so that it exhibits a random drift in frequency. The resulting random delay timed by the counter 16a will occupy a time interval of the order of 6 pulses of the clock pulse generator 14 through the AND gate 15. Following this random delay the random counter 16a causes the paragraph counter 16 to commence the counting of pulses from the clock pulse generator 14.

The count value of the paragraph counter 16 is monitored by a count decoder 17 which is normally arranged to detect a given count (8 to 16 in this example) before opening a transmission latch 18 which in turn sends a "transmitter enable" signal to the associated transmitter causing it to commence transmission of its data, at the same time sending a pulse to the line to inhibit the other transmitters. The transmitter enable signal also sets a transmitter line latch 19 which connects the transmitter to the line or channel 1.

From the foregoing it can be seen that if no noise or signal exceeding a predetermined threshold level is present on the line or channel 1, the transmitter will commence transmission after a total ¢wait interval" of between 26 and 34 clock pulses or bits, the "wait" interval being made up of 12 bits counted by counter 12, 6 bits counted by counter 16a, and 8 to 16 bits counted by counter 16 (see FIG. 3). If however, the detector 10 detects the presence of noise or a signal from any other transmitter on the line during the "wait" interval, the counters 12, 16a and 16 will be reset preventing the opening of the transmission latch 18.

When the transmitter has completed the transmission of its data it passes a "transmitter done" signal to a "done latch" 20, previously reset by the transmitter enable signal. Upon being set by the "done" signal the latch 20 provides a transmitter disenable signal which prevents further operation of the transmitter and also sets the listen latch 13, causing the latter to close the gate 11 so that the line listening detector 10 is effectively prevented from resetting the counter 12 for the remainder of the paragraph interval t now timed by the counter 16.

At the end of the paragraph interval t the counter 16 triggers an end of paragraph decoder 21 which supplies a reset signal to the counter 16 itself, to the transmission latch 18 and to the listen latch 13. The system then reverts to the "line listening" mode, with the gate 11 open and the latch 8 reset. This occurs at the end of the time interval t, which is arranged to occur when all transmitters in the sequence have had time to transmit.

From the preceding description it will be clear that the transmitters will automatically assume a sequence of operation determined by the random differences which will necessarily exist between the random delays introduced by the random counter 16a in each timer unit. The first timer unit to reach the count of $n_1$ clock pulses (where $n_1$ is the lowest count of the random counters 16a) will initiate operation of its associated transmitter, after which this transmitter will be effectively inhibited for the remainder of the paragraph interval t so that in the period of line silence following the end of the first transmission the transmitter timer unit which counts the number of clock pulses closest to $n_1$ will initiate operation of its associated transmitter, and so on, until all the transmitters have operated. At the end of the timed paragraph interval, which in the ordinary way will coincide with the end of the last transmission in the sequence, the first transmitter timer unit is again reset and the sequence to ready to start again.

If a given transmitter station has information, such as an alarm or other change of state condition, which requires immediate out-of-sequence transmission a change of state (C.O.S.) latch 22 in the associated timer unit is operated automatically in response to the change of state condition to reset the listen latch 13 of the timer unit and to change the state of the decoder 17 so that it detects a reduced number of clock pulses, in this case zero instead of eight. This will mean that the decoder 17 will initiate operation of the associated transmitter before any of the other transmitters, thereby causing the transmitter station at which the change of state has been detected to "jump" onto the line or channel 1 ahead of the next transmitter in the sequence. After the out-of-sequence transmission in the transmitters continue in a new sequence with the "jumped" one in its new position in the sequence, the change of state latch 22 being reset by the "done" latch 20 after completion of the out-of-sequence transmission.

I claim:

1. A data transmission system comprising a plurality of transmitters, a communication channel, and a receiver arranged to receive data transmitted from the individual transmitters sequentially over said communication channel, each said transmitter comprising:

first timing means which, during periods when it is enabled, is arranged to time a first time interval, the first timing means being further arranged to generate an output signal upon completion of the timing of said first interval, a channel signal detector coupled to said communication channel and arranged to generate an output signal in the absence of a signal or noise on said channel, control means connected to said signal detector and said first timing means and responsive to the presence of the signal-detector output signal to enable the first timing means only during the absence of detected signal or noise on said channel, signal transmission means coupled to said communication channel and operative in response to the generation of a said output signal by the first timing means to transmit a data message of predetermined duration in signal form over said channel to said receiver, and inhibit means which, following the transmission of a said data message by said signal transmission means, is operative to prevent said transmission means from transmitting a further said data message over said channel for a second time interval the duration of which is sufficient to allow the other said transmitters to sequentially transmit their associated data messages, said inhibit means including second timing means for timing said second time interval, the duration of said first time intervals differing for each said transmitter by random delays whereby upon initial operation of the system, the transmitters will transmit in a sequence randomly established by the relative duration of their said first intervals, and therefor this sequence is maintained.

2. A system according to claim 1, wherein said control means is arranged to reset said first timing means upon said signal detector detecting the presence of a signal or noise on said communication channel.

3. A system according to claim 1, wherein said first timing means comprises a fixed-interval timer for timing a fixed interval the duration of which is the same for every said transmitter, and a random-delay timer for timing a random delay different for each said transmitter, the said first interval being made up of said fixed interval and random delay in combination.

4. A system according to any one of claims 1 to 3, wherein said first timing means comprises a random-delay timer constructed from components which for each said transmitter have the same nominal values, the tolerances on the component values being such that each random-delay timer times a period slightly different from that of any other said random-delay timer.

5. A system according to claim 2, wherein each said transmitter includes a change of state detector operative in response to the existence of a change of state condition, such as an alarm condition, at the transmitter, to generate an override signal which is fed to the control means and inhibit means of the same transmitter, the inhibit means of said transmitter being responsive to a said override signal fed thereto cancel its transmission—preventing operation where such operation is being effected, and the first timing means of each said transmitter being operable both in a normal mode in which when enabled it times said first time interval, and in an override mode in which when enabled it times an override time interval which is less than the first interval of any of said transmitters, the associated said control means changing the first timing means from its normal to override operating modes upon the receipt of a said override signal whereby, following the termination of the data message being transmitted at the time of generation of a said override signal, the transmitter in which said override signal is present is first to start transmission.

* * * * *